United States Patent [19]

Hlinka et al.

[11] Patent Number: 4,671,727
[45] Date of Patent: Jun. 9, 1987

[54] CUTTER CHAIN CONSTRUCTION FOR A BOTTOM UNLOADER

[75] Inventors: James J. Hlinka, Hanover Park; Edward W. Fundahn, McHenry, both of Ill.

[73] Assignee: A. O. Smith Harvestore Products, Inc., Arlington Heights, Ill.

[21] Appl. No.: 836,801

[22] Filed: Mar. 6, 1986

[51] Int. Cl.[4] .............................................. B65G 65/42
[52] U.S. Cl. ....................................... 414/306; 83/833
[58] Field of Search ........................ 414/306, 307, 308; 83/794, 833

[56] References Cited

U.S. PATENT DOCUMENTS

| | | | |
|---|---|---|---|
| 2,635,770 | 4/1953 | Tiedemann | 414/307 |
| 2,675,931 | 4/1954 | Makous . | |
| 2,702,485 | 2/1955 | Nadherny | 74/242.14 |
| 2,711,834 | 6/1955 | Broberg et al. | 414/306 |
| 2,718,970 | 9/1955 | Dueringer | 414/308 |
| 2,764,031 | 9/1956 | Nystrom | 74/242.17 |
| 2,955,719 | 10/1960 | Hilderbrand | 414/306 |
| 3,035,718 | 5/1962 | Behlen | 414/306 |
| 3,374,906 | 3/1968 | Zimmerman | 414/308 |

Primary Examiner—Donald R. Schran
Attorney, Agent, or Firm—Andrus, Sceales, Starke & Sawall

[57] ABSTRACT

An improved cutter chain construction for a bottom unloader of a storage structure. A cutter arm is mounted for rotation about the center of the storage structure, and an endless chain travels in an endless path on the cutter arm and carries a plurality of cutting members or hooks that are mounted at spaced intervals along the length of the chain. Each cutting member has a relatively thin body with a sharp leading edge and an outer enlarged head. The cutting members are mounted in a sequence along the length of the chain. A first cutting member in the sequence extends laterally outward from the chain and is disposed in a first plane, while the next succeeding cutting member lies in a second plane disposed at an acute angle to the first plane, whereby movement of the cutting members through the stored material will cut a wedge shaped mass. A dislodging bar is mounted on the chain, trailing the second cutting member, and the dislodging bar extends laterally outward in a third plane located between the first and second planes, so that the dislodging bar will dislodge the wedge shaped mass cut by the first and second cutting members.

12 Claims, 5 Drawing Figures

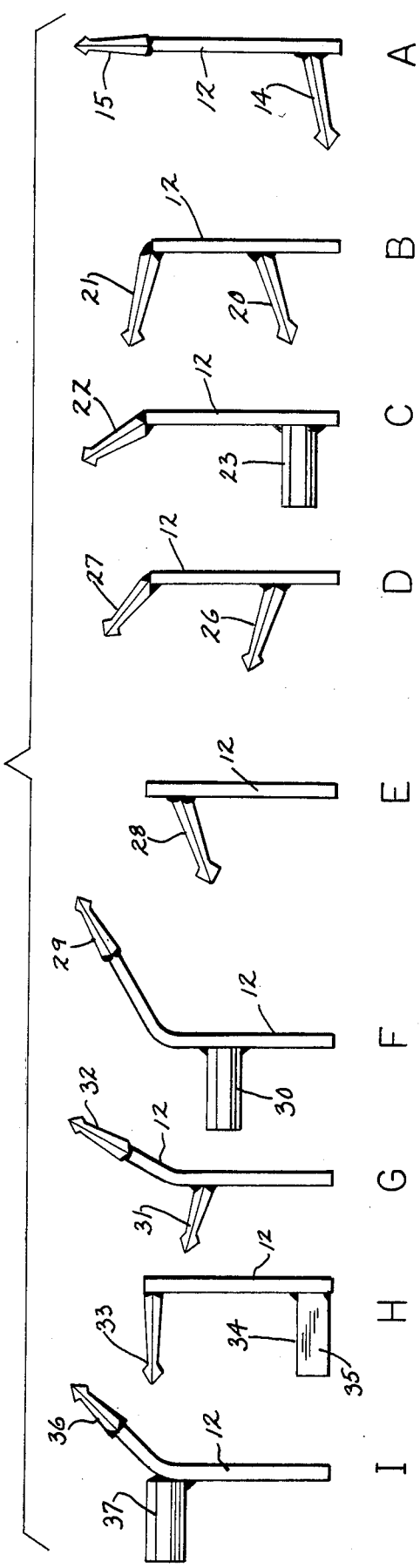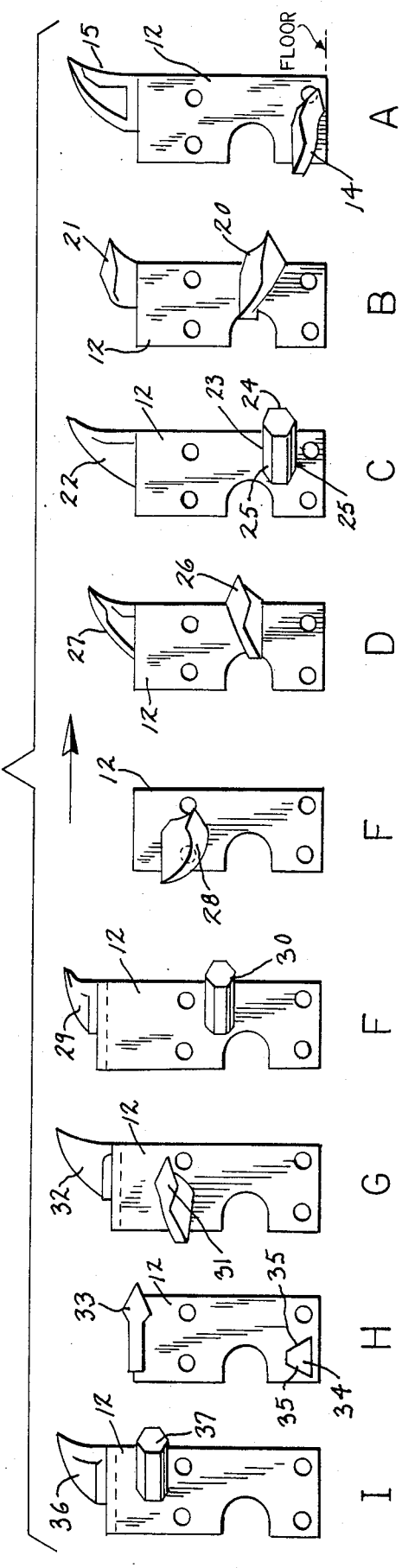

CUTTER CHAIN CONSTRUCTION FOR A BOTTOM UNLOADER

BACKGROUND OF THE INVENTION

Feed material, such as silage, is frequently stored in a hermetically sealed storage structure or silo, and the stored material is removed from the structure by a bottom unloader. The conventional bottom unloader, as disclosed in U.S. Pat. No. 2,635,770, takes the form of a cutter arm which is mounted for rotation about the center of the silo and carries an endless cutter chain having a plurality of hook-shaped cutter teeth. The chain travels in an endless path on the cutter arm. As the arm sweeps around the bottom of the structure, the cutter teeth on the chain cut through and dislodge the stored material and convey the dislodged material to a trough located in the floor of the structure. A conveyor mounted in the trough then conveys the dislodged material through the trough to the exterior of the structure.

The conventional cutter teeth have a hook-like configuration, including a relatively thin body having a sharp leading edge and an outer, enlarged, diamond shaped head. In the past, the cutter teeth have been mounted in a random arrangement on the chain with some of the teeth projecting laterally outward from the chain, other teeth projecting upwardly and outwardly from the chain, while still other teeth projected upwardly and inwardly over the chain.

It has been found that chopped grass, lacking heavy stems or stalks, compacts very tightly in a storage structure, producing a dense and hard packed mass. Because of the densely packed nature of grass material, the delivery rate of the conventional bottom unloader is substantially reduced, as opposed to the delivery rate of a coarser material such as silage. As the delivery rate is reduced, the time required to deliver a given quantity of grass from the structure is considerably greater than the time required to deliver an equal amount of silage.

SUMMARY OF THE INVENTION

The invention is directed to a cutter chain construction for a bottom unloader that has improved effectiveness in dislodging and removing densely packed material, such as grass, from the storage structure. In accordance with the invention, a plurality of cutting members or teeth are mounted in a precise pattern along the length of the cutter chain of the bottom unloader. In the sequence, a first cutting member exends laterally outward from the chain and is disposed in a first plane, while the next succeeding cutting member extends laterally outward from the chain and lies in a second plane disposed at an acute angle to the first plane, whereby movement of the cutter members through the stored material will act to cut a wedge shaped mass of the stored material.

Trailing behind the second cutter member is a dislodging bar that extends laterally outward from the chain in a third plane located between the first and second planes to thereby dislodge the wedge shaped mass.

The next succeeding cutting members will cut a second wedge-shaped mass located above the first wedge shaped mass and the second wedge-shaped mass will then be removed in the same manner by a second dislodging bar. This sequence of cutting wedge shaped masses and dislodging the masses is repeated throughout the length of the cutter chain.

The cutter chain of the invention is more effective in dislodging and removing densely packed materials, such as grass. By initially cutting wedges along the floor and removing the wedges, and then cutting wedges at a higher level the second wedges can fall into the space formerly occupied by the first wedges to aid in the dislodging of stored material.

The cutting members and dislodging members are positioned on the chain so that there is a vertical overlap between the members in the pattern, thereby insuring that all of the stored material is contacted by the cutting and dislodging members.

The cutting pattern also includes a tapered pushing bar which is located at the end of the sequence and aids in pushing the dislodged material along the floor of the structure and depositing the dislodged material in the trough.

Other objects and advantages will appear in the course of the following description.

DESCRIPTION OF THE DRAWINGS

The drawings illustrate the best mode presently contemplated of carrying out the invention.

In the drawings:

FIG. 2 is a schematic side elevation showing the pattern of cutting members and dislodging members;

FIG. 3 is a view showing the ends of the cutting members and dislodging members shown in FIG. 2;

DESCRIPTION OF THE ILLUSTRATED EMBODIMENT

Figure 1:
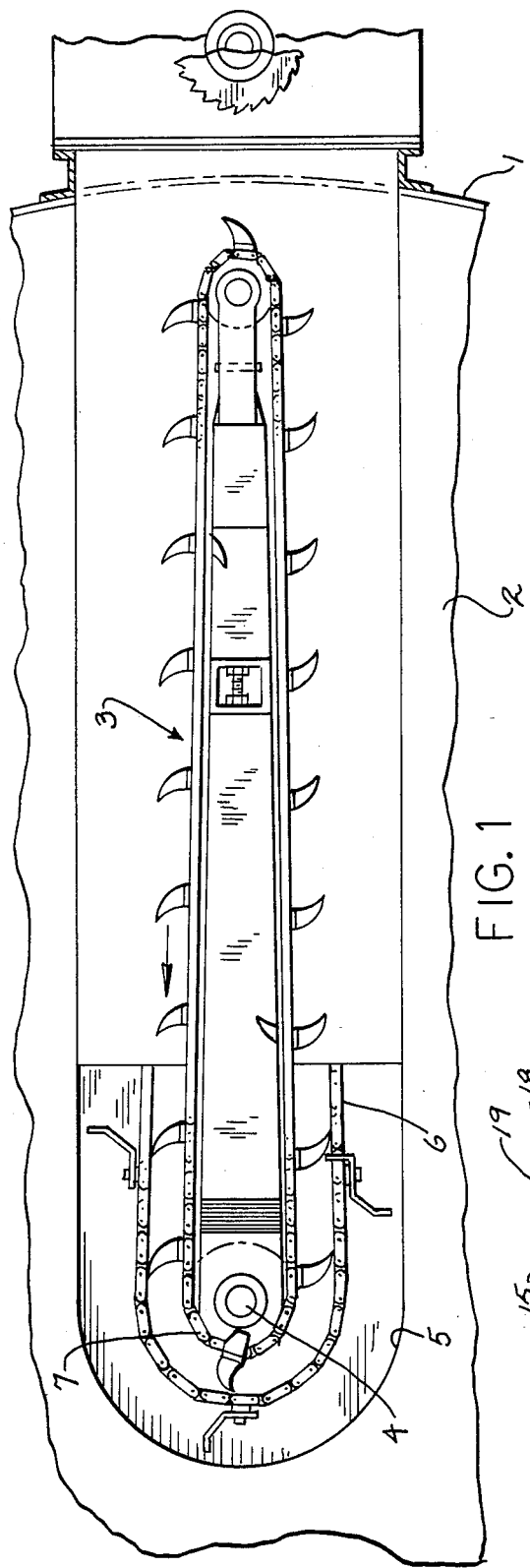
FIG. 1 is a fragementary plan view of a storage structure having a cutter arm incorporating the cutter chain construction of the invention.

FIG. 1 illustrates a storage structure or silo 1 to contain a stored material, such as grass or other highly compacted material. The storage structure 1 is supported on a foundation 2 and a cutter arm 3 is mounted for rotation about a center post 4 at the center of the structure. Cutter arm 3 sweeps around the foundation 2 and acts to undercut the stored material and convey the stored material to a radially extending trough 5 formed in foundation 2. A conveyor 6 conveys the stored material through the trough to the exterior of the structure in a conventional manner.

A chain 7 is mounted for endless travel on cutter arm 3, and the cutter arm 3 can be rotated about post 4 and conveyor 6 driven in endless travel by a drive mechanism as disclosed in U.S. Pat. No. 2,635,770.

Figure 5:
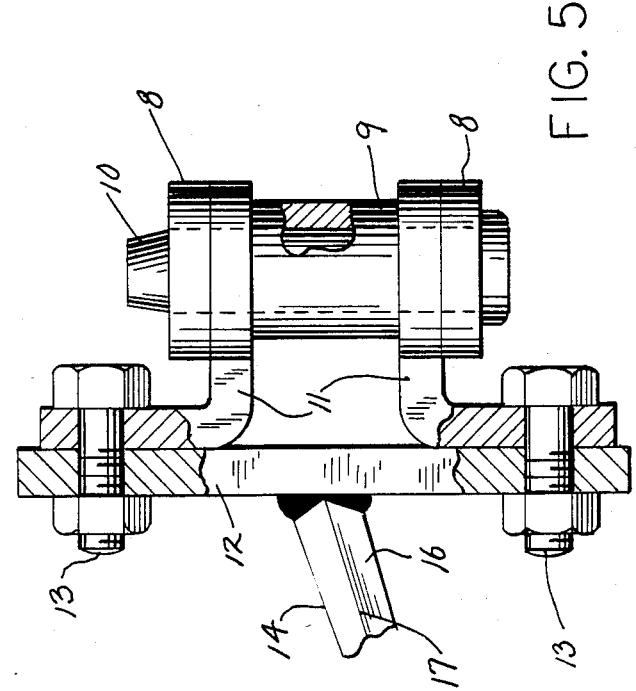
FIG. 5 is an end view, with parts broken away, of the structure of FIG. 4.
Figure 4:
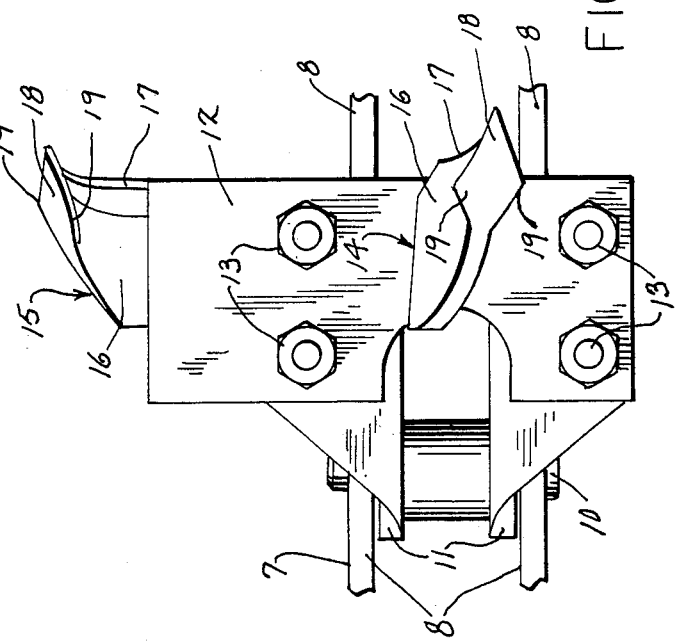
FIG. 4 is an enlarged side elevation showing the attachment of a cutting member to the chain.

As best illustrated in FIGS. 4 and 5, chain 7 includes a plurality of generally parallel links 8 which are spaced apart by bushings 9 and pins 10 extend through the bushings and aligned openings in the links 8 to connect the links together. Angle brackets 11 are mounted on pins 10 and are located inwardly of links 8, and a supporting plate 12 is mounted through bolts 13 to the vertical flanges of each pair of angle brackets 11, as illustrated in FIG. 5.

In accordance with the invention, one or more cutting members or teeth are attached to each plate 12 and the cutting members are arranged in a precise sequence or pattern indicated by A–I in FIGS. 2 and 3. This sequence A–I is repeated throughout the entire length of the endless chain 7.

At the station A in the sequence or pattern, a pair of cutting members 14 and 15 are mounted on plate 12. Cutting member 14 extends downwardly and outwardly from plate 11 at an angle of about 10° to the horizontal, while cutting member 15 extends vertically upward from the plate. The cutting members 14 and 15 are generally hook-shaped in configuration, as shown in FIG. 4, having a relatively thin body portion 16 with a relatively sharp leading edge 17. The body 16 terminates in an enlarged diamond shaped head 18 having laterally extending ears 19. As shown in FIG. 2, the lower ear 19 of cutting member 14 is at a level approximating the lower end of plate 12, and travels about 1/16 inch above the foundation 2.

At station B, which trails station A in the direction of travel of the chain, a pair of cutting members 12 and 21 are mounted on plate 12. The lower cutting member 20 extends downwardly and outwardly at an acute angle of about 20° with respect to the horizontal, which is a greater angle than that of cutting member 14 at station A. Thus, cutting member 14 in conjunction with the following cutting member 20 act to cut a wedge shape mass of the stored material.

Cutting member 21, as shown in FIG. 3, extends outwardly and upwardly from plate 12.

At station C, plate 12 carries a cutting member 22 which extends upwardly and outwardly from plate 12 as well as a dislodging member or bar 23 that projects outwardly from plate 11 in a horizontal plane which is located between the planes of the cutting members 14 and 20, so that the dislodging bar 23 will remove the wedge shape mass cut by the cutting members 14 and 20. As best shown in FIG. 2, dislodging bar 23 is preferably hexagonal in cross section and is canted forwardly from plate 12 in the direction of travel of chain 7. With this canted arrangement, the dislodging bar 23 presents a generally sharp, vertical leading edge 44 and a pair of inclined surfaces 25 bordering edge 24. Edge 24 aids in dislodging the cut wedge shape mass and the inclined surfaces 25 reduce the resistance of movement of the bar through the mass.

At station D a pair of cutting members 26 and 27 are mounted on plate 12. Cutting member 26 is mounted on the central portion of plate 12 and extends upwardly at an angle of about 20° to the horizontal, while cutting member 24 extends upwardly and outwardly from the upper edge of plate 12. Cutting members 26 and 27 have a hook like shape similar to cutting members 14 and 15.

At station E a single cutting member 28 is mounted on plate 12 and extends downwardly and outwardly at an angle of about 20° with respect to plate 11. Cutting member 28 acts in conjunction with the preceeding member 26 to cut a wedge shaped mass of stored material, in the manner previously described.

At station F a cutting member 29 extends upwardly and inwardly over the chain 7, while a dislodging bar 30 extends laterally outward from plate 11 in a plane between the planes of cutting members 26 and 28. Dislodging member 30 is similar in construction to dislodging bar 23 and acts to dislodge the cut wedge shaped mass of the stored material cut by preceding members 26 and 28.

At station G a pair of cutting members 31 and 32 are mounted on plate 12, with cutting member 31 extending upwardly and outwardly from the plate at an angle of about 15° to the horizontal. Cutting member 32 projects upwardly and inwardly over the conveyor. Cutting members 31 and 32 have a configuration similar to that described with respect to cutting members 14 and 15.

At station H a cutting member 33 is mounted on the upper end of plate 12 and extends laterally outward from the plate in a generally horizontal plane. The cutting members 31 and 33 operate in planes located an acute angle with respect to each other to thereby cut a wedge-shaped mass of the stored material, as previously described.

In addition to cutting member 33, plate 12 at station H also carries generally triangular pusher bar 34 which projects laterally outward from the lower end of plate 12. Bar 34 aids in pushing or conveying the dislodged material along the foundation 2 and depositing the dislodged material into trough 5. The tapered side edges of bar 35 reduce the frictional resistance on start up of the unloader in either the forward or reverse direction.

At station I a cutting member 36 extends upwardly and inwardly from plate 12 and a dislodging bar 37, similar in construction to bar 23, extends laterally outward from plate 11 in a plane between the planes of opertion of cutting members 31 and 33. As previously described, the dislodging bar 37 will dislodge the wedge of material cut by the cutting members 31 and 33.

As previously noted, the sequence A–1 is repeated throughout the length of cutter chain 7.

In the sequence A–I, as described, three wedges of material are cut by the cutting members and the initial wedge, cut by members 14 and 20, is located adjacent the foundation 2. As this lower wedge is cut and removed, the next wedge cut by members 26 and 28 can fall downwardly into the space formerly occupied by of the removed first wedge. Similarly the third wedge cut by the members 31 and 33 can fall downwardly into the space formerly occupied by the preceeding wedges of cut material. This aids in providing a more effective removal of the stored material.

Various modes of carrying out the invention are contemplated as being within the scope of the following claims particularly pointing out and distinctly claiming the subject matter which is regarded as the invention.

We claim:

1. A cutter chain construction for a bottom unloader in a storage structure, comprising an endless chain mounted for endless travel over a foundation of the storage structure, a plurality of cutting members connected at spaced intervals along the length of said chain and including a first cutting member extending laterally outward from the chain and disposed in a first plane, the next succeeding cutting member in the direction of travel of said chain extending laterally outward from said chain and disposed in a second plane located at an acute angle to said first plane, said cutting members having relatively sharp leading edges in said direction of travel, whereby movement of said cutting members through said stored material will cut a wedge shaped mass of said material, and a dislodging member mounted on said chain and trailing said second cutting member, said dislodging member extending laterally outward from said chain and disposed in a third plane between said first and second planes, said dislodging member having a substantially thicker leading edge than the leading edges of said cutting members and acting to dislodge said wedge shaped mass.

2. The cutter chain construction of claim 1, wherein said dislodging member comprises a bar canted forwardly in the direction of travel of said chain.

3. The cutter chain construction of claim 2, wherein the bar has a generally vertical leading edge.

4. The cutter chain construction of claim 3, wherein said bar has a generally hexagonal cross section.

5. A cutter chain construction for a bottom unloader associated with a storage structure, comprising an endless chain mounted for endless travel over a foundation of the structure, a plurality of hook like cutting members connected at spaced intervals along a length of said chain and including a first cutting member extending laterally outward from the chain and disposed in a first plane, said plurality also including a second cutting member trailing said first cutting member in the direction of travel of said chain and extending laterally outward from said chain and disposed in a second plane located at an acute angle to said first plane, said cutting members having relatively sharp leading edges in said direction of travel, whereby movement of said first and second cutting members through the stored material will cut a wedge shaped mass of said materials, and a dislodging bar mounted on the chain and trailing said second cutting member, said dislodging bar extending laterally outward from said chain and disposed in a third plane located between said first and second planes and having a substantially thicker leading edge than the leading edges of said cutting members whereby said dislodging bar will dislodge said wedge shaped mass of material, said dislodging bar being canted forwardly in the direction of travel of said chain.

6. The cutter chain construction of claim 5, wherein said dislodging bar is disposed in a generally horizontal plane.

7. The cutter chain construction of claim 5, wherein said first cutting member extends downwardly at a first acute angle to the horizontal and said second cutter member extends downwardly at a second acute angle to said horizontal, said second acute angle being greater than said first acute angle.

8. The cutter chain construction of claim 7, wherein the outer extremity of said first cutting member is disposed slightly above said foundation.

9. The cutter chain construction of claim 5, wherein said dislodging bar has a substantially uniform cross sectional configuration throughout its length.

10. The cutter chain construction of claim 9, wherein said dislodging bar is hexagonal in cross sectional configuration.

11. The cutter chain construction of claim 5, and including a pusher bar mounted on said chain and following said dislodging member, said pusher bar extending laterally outward from the chain and positioned slightly above said foundation, said pusher bar being constructed and arranged to push the dislodged material along said foundation to a collection site.

12. The cutter chain construction of claim 11, wherein said pusher bar is generally triangular in cross section having a pair of side surfaces that extend downwardly and outwardly.

* * * * *